Figure 1:
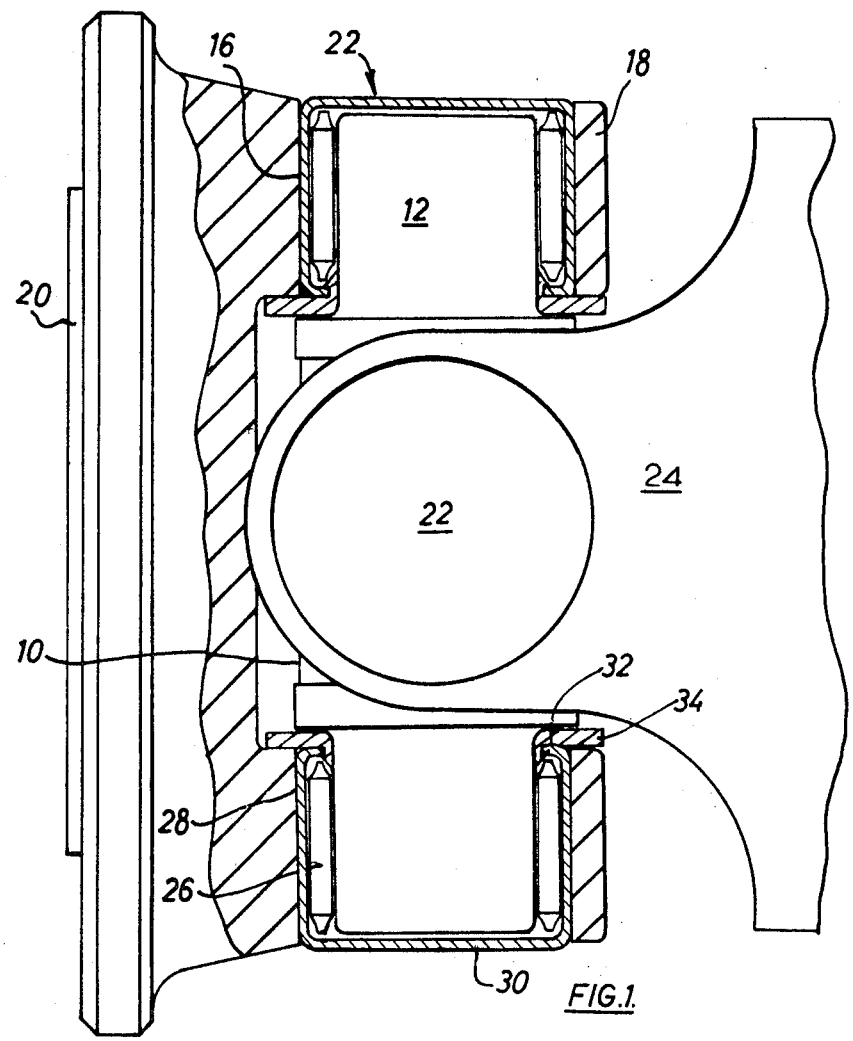

United States Patent

[11] 3,585,816

| [72] | Inventor | Robert S. Batt<br>Barby, near Rugby, England |
|---|---|---|
| [21] | Appl. No. | 843,319 |
| [22] | Filed | July 22, 1969 |
| [45] | Patented | June 22, 1971 |
| [73] | Assignee | The Torrington Company Limited<br>Coventry, England |
| [32] | Priority | July 26, 1968 |
| [33] | | Great Britain |
| [31] | | 35,696/68 |

[54] NEEDLE BEARING ESPECIALLY FOR UNIVERSAL JOINTS
1 Claim, 5 Drawing Figs.

[52] U.S. Cl. .................................................. 64/17A, 308/217
[51] Int. Cl. .................................................. F16d 3/26
[50] Field of Search .......................................... 64/17, 17 A; 308/216, 207, 213

[56] References Cited
UNITED STATES PATENTS
| 2,606,798 | 8/1952 | Hickling .................. | 308/213 |
| 2,916,896 | 12/1959 | Miller, Jr. .................. | 64/17-A |

*Primary Examiner*—Mark M. Newman
*Assistant Examiner*—Randall Heald
*Attorneys*—Carl R. Horten, David W. Tibbott and Frank S. Troidl

ABSTRACT: In a roller bearing having an outer race, a plurality of rollers distributed around the interior of the race and a flange at one end of the race for retaining the rollers axially therein, the invention provides an annular washer having axially spaced, radially directed portions which are adapted to snap over the race flange to hold the washer on the race, an axial washer portion lying between the radial portion thereof then acting to retain the rollers radially within the said end of the race.

INVENTOR:
ROBERT S. BATT

ATTORNEYS

NEEDLE BEARING ESPECIALLY FOR UNIVERSAL JOINTS

This invention concerns rolling bearings.

In many constructions of roller bearing comprising a full complement of rollers housed within a cylindrical outer race, it is usual, in the absence of a cage or retainer to retain the rollers in the race, to form the latter with radially directed end flanges which at their free ends are bent axially inwardly to prevent the rollers from falling out of the race. Again, in bearing constructions which employ cages or retainers to retain the rollers in the race, similar radial end flanges are often provided to limit axial movement of the cage within the race. However, especially in the case of races which themselves are made from drawn or pressed sheet metal, it can be difficult within the tolerance ranges required in the bearing construction, satisfactorily to accomplish the necessary bending steps, while the finished flanges may in any event be somewhat demanding of space.

The invention seeks to avoid or at least to reduce the extent of these difficulties.

According to the present invention, a roller bearing comprises a cylindrical outer race having at least one of its ends formed with a radially inwardly directed end flange and a snap-in annular end washer having a first radially outwardly directed portion lying flat against the exterior surface of said end flange and a second radially outwardly directed or detent portion spaced axially inwardly of said first portion and having a surface engaging the interior surface of said end flange to retain said race and said washer secured to one another.

By virtue of the annular end washer proposed by the invention the necessity to form the end flange of the bearing race with an axially inwardly directed, roller or cage guiding or retaining fold is eliminated with consequential simplification of the assembly of the bearing. Moreover, by forming the first radial portion of the washer of appropriate radial length, it may act as a thrust washer in situations wherein the roller is subjected to occasional axial thrust.

Preferably the detent portion of the washer has a second surface which intersects the first-mentioned surface and, at least at the free end region of the detent portion, is radially inwardly inclined or curved in a direction from the intersection towards the said free axial end.

More particularly where it is intended for use as a thrust washer, the annular washer is made of a plastics material such as nylon or polytetrafluorethylene having solid surface lubricant properties.

Figure 2:
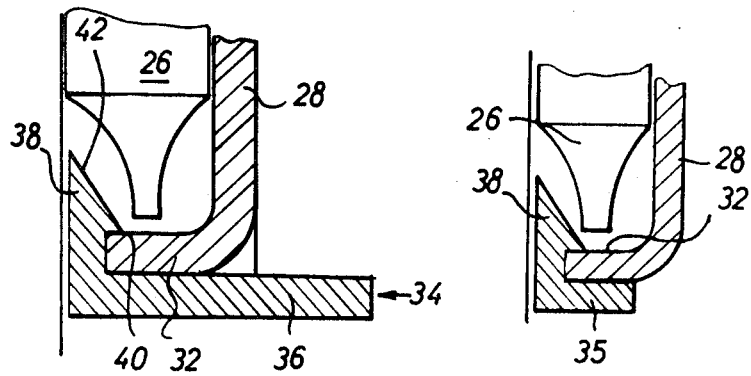
Figure 3:
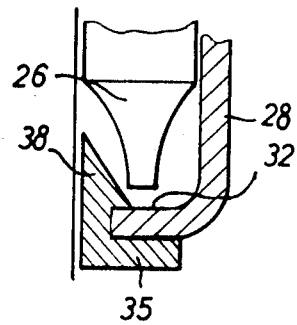
Figure 4:
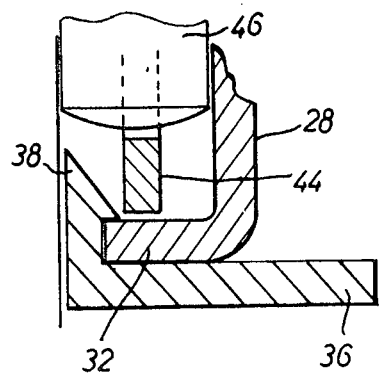
Figure 5:
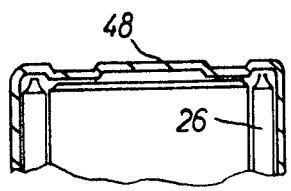

The invention will be described further, by way of example, with reference to the accompanying drawings, in which:

FIG. 1 is an elevation, partly in section, of a universal joint incorporating bearings embodying the invention, FIG. 2 is a sectional detail, to an enlarged scale, of a part of one of the bearings, FIGS. 3 and 4 are similar details illustrating modifications of the bearing, and FIG. 5 is a sectional detail of a modification of the universal joint shown in FIG. 1.

The universal joint shown in FIG. 1 comprises a central block 10 which is bored to receive mutually perpendicular shafts, of which one shaft 12 is visible in the drawing. Opposite ends of the shaft 12 are received in apertures 16 of arms 18 of a fork member 20 and a needle bearing generally designated 22 is interposed between each shaft end and the arm 18 in which it is housed. A second fork member 24 is connected to the central block 10 in a similar manner.

The needle bearings 22 each include a plurality of needle rollers 26 located within a cylindrical outer race 28 which is deep drawn from sheet metal in the form of a cup having a closed outer end 30. For the purpose of preventing axial movement of the rollers sufficient to enable them to fall out of the race 28, the opposite end of the latter is formed with a radially inwardly directed lip or flange 32.

The needle bearing construction as thus far described is conventional and in the usual arrangement, the needles are guarded against radial movement which would permit them to drop out of the race 24 by forming the end flange 32 of the race with an axially directed free end. In accordance with the present invention, however, this is replaced by a snap-in annular washer 34 having a radial body portion 36 which lies flat against the end flange 32 of the race 28 and a detent portion 38 generally in the form of a barb or arrowhead spaced axially inwardly of the body portion 36. The detent portion has a radially inwardly directed surface which engages as a snug fit behind the inner radial surface of the end flange 32. Intersecting the surface 40 is a second surface 42 which is radially inwardly inclined in a direction towards the free end of the detent portion. The inclined surface 42 facilitates the introduction of the washer into the open end of the bearing and enables the detent surface 40 to snap into engagement behind the flange 32.

It will be noted that the needles 26 are trunnion ended and that the detent portion 38 cooperates with the end flange of the bearing race in retaining the needles securely in the latter against both axial and radial movement. Moreover, in the universal joint shown in FIG. 1, the washer acts as a thrust washer between the central block 12 and the arm 16 to prevent loss of the bearing from the joint even if it should be subjected to a degree of axial thrust.

The modification illustrated in FIG. 3 differs from that previously described principally in the radial length of the body portion 35 of the washer, which is shown as being shorter since the only function of the washer in this embodiment is to retain the needles 26 in the race 24.

FIG. 4 illustrates a bearing employing a cage or retainer 44 for spherical ended rollers 46, the flange 32 acting to limit axial movement of the cage in the bearing race 28.

FIG. 5 shows a modification of the joint described with reference to FIG. 1, in which the plain end 30 of the bearing race is replaced by a shaped end 48 providing a degree of retention for the trunnion ends of the rollers 26.

I claim:

1. A roller bearing comprising a cylindrical outer race, a radially inwardly directed end flange formed on at least one end of said race, a plurality of rollers arranged within the race, and a permanent snap-in annular end washer having a first radially outwardly directed portion lying flat against the exterior surface of said end flange and having a greater radial length than the end flange, and a second radially outwardly directed or detent portion spaced axially inwardly of said first portion and having a surface engaging the interior surface of the end flange to retain the race and said washer secured to one another.